United States Patent [19]
Holden

[11] 3,820,061
[45] June 25, 1974

[54] CONNECTOR FOR PRINTED CIRCUIT BOARDS

[75] Inventor: Thomas E. Holden, Santa Cruz, Calif.

[73] Assignee: Hewlett-Packard Company, Palo Alto, Calif.

[22] Filed: Sept. 5, 1972

[21] Appl. No.: 286,490

[52] U.S. Cl. .............................................. 339/252
[51] Int. Cl. .............................................. H01r 11/22
[58] Field of Search ........... 339/252 R, 252 P, 17 C, 339/17 R, 276 SF, 18, 221 R, 221 M, 254 R, 252 S, 258 F, 258 S

[56] References Cited

UNITED STATES PATENTS

| | | | |
|---|---|---|---|
| 3,069,652 | 12/1962 | Greco | 339/252 R |
| 3,072,880 | 1/1963 | Olsson | 339/17 R |
| 3,394,454 | 7/1968 | Logan | 339/97 R |
| 3,524,161 | 8/1970 | Frantz et al. | 339/220 R |
| 3,634,819 | 1/1972 | Evans | 339/252 P |
| 3,729,175 | 4/1973 | Grenda | 339/276 SF |

*Primary Examiner*—James R. Boler
*Assistant Examiner*—Wai M. Chan
*Attorney, Agent, or Firm*—Patrick J. Barrett

[57] ABSTRACT

A connector for providing mechanical support and electrical contact between two printed circuit boards, or between an electrical component and a printed circuit board includes a base, two contact members, and a guide tip. A plurality of the connectors may be aligned by one or more removable tabs until assembly or encapsulation.

6 Claims, 5 Drawing Figures

CONNECTOR FOR PRINTED CIRCUIT BOARDS

BACKGROUND OF THE INVENTION

Typically electro-mechanical connections between electrical components such as printed circuit boards, integrated circuits, or individual electronic components have been accomplished in two ways: conductive wires or plug-in receptacles. Unfortunately, both of these methods suffer from many disadvantages. Soldering individual wires is expensive, time-consuming and makes re-work difficult. Plug-in receptacles, while allowing easy disassembly, are also relatively time-consuming to install and therefore expensive. The soldered connections between the receptacle and the printed circuit board make changing receptacles difficult, and because the receptacles are bulky in comparison to common subminiature components, they reduce assembly packing density.

SUMMARY OF THE INVENTION

This invention utilizes connectors having a base, a supportive member connected to the base, a contact member connected to the base, and a guide tip connected to the supportive member. Encapsulation of the connectors within a component, or one or more removable tabs are used to maintain alignment of a plurality of the connectors. In one preferred embodiment the many connectors are arranged parallel to each other and each connector is separated from adjacent connectors. A first removable tab is connected orthogonally to one end of each of the connectors and a second removable tab is connected orthogonally to the opposite end of each of the connectors. In another preferred embodiment encapsulation of the connectors within a component is used to maintain their alignment prior to assembly.

DESCRIPTION OF THE PREFERRED EMBODIMENT

Figure 1:
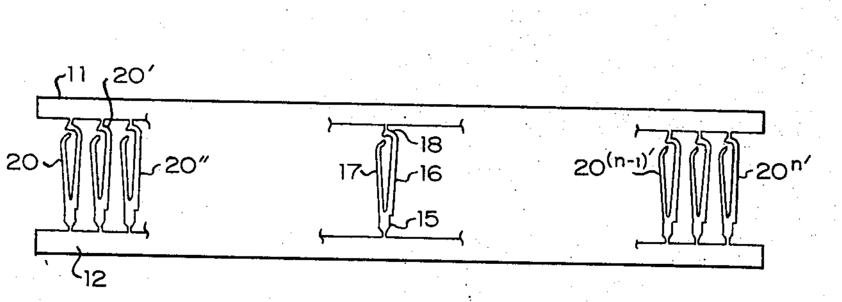
FIG. 1 is a view of one preferred embodiment showing the connectors and the removable tabs.

FIG. 1 shows the preferred embodiment of an apparatus for electrically or mechanically connecting two components, here printed circuit boards. Removable tabs 11, 12 maintain the desired alignment of a plurality of electrical connectors 20, 20′, 20″ . . . 20$^{n\prime}$ where n may be any desired number. Each of the connectors includes a base 15, a supportive member 16, a flexible contact 17, and a guide tip 18.

The separation between adjacent connectors may be made to correspond to the separation between holes drilled into the printed circuit board. To install a plurality of the connectors between two printed circuit boards one removable tab connecting the ends of the plurality of connectors is broken off by bending it away from the plane of the connectors, i.e., perpendicular to the surface shown in FIG. 1. The ends of the connectors are then inserted into the holes on the first of the two printed circuit boards to be connected. The other tab is then removed and the second printed circuit board mated to the connectors. If a more permanent connection is desired the connectors may be soldered to either or both of the printed circuit boards.

Figure 2:
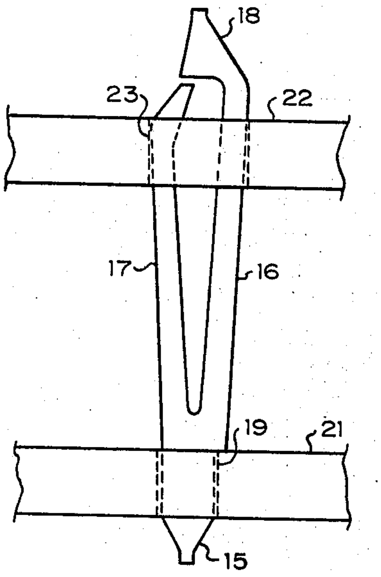
FIG. 2 is a view of a connector in place between two printed circuit boards.

FIG. 2 shows a view of one of the connectors in place between two printed circuit boards 21, 22. This assembly is created in the following manner: the base of the connector 15 is inserted into a plated-through hole 19 in the lower printed circuit board 21. The upper printed circuit board 22 having a plated-through hole 23 is then pressed down over the guide tip 18 and is held in that position by means, not shown in FIG. 2, such as a screw. Because contact member 17 is compressed by the sides of hole 23 toward supportive member 16, a good electrical contact between the connector and the printed circuit board hole 23 is maintained.

Figure 3:
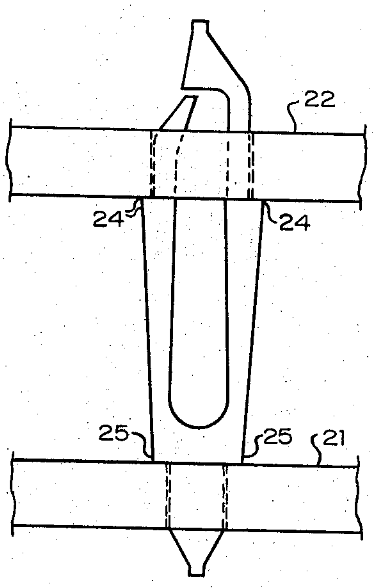
FIG. 3 shows one preferred embodiment of a connector in place between two printed circuit boards.

FIG. 3 shows an alternative embodiment of the connector in place between two printed circuit boards. In this embodiment the connector functions as a mechanical support for the upper circuit board 22 and provides electrical contact between the plated-through holes 19, 23 of the two circuit boards 21, 22. The mechanical support is achieved by the formation of shoulders 24, 25 in the connector. This allows the connector to be inserted into the lower printed circuit board 21 only to a certain depth before resting upon shoulder 25. Shoulder 24 prevents the upper printed circuit board 22 from sliding down the connector.

Figure 4:
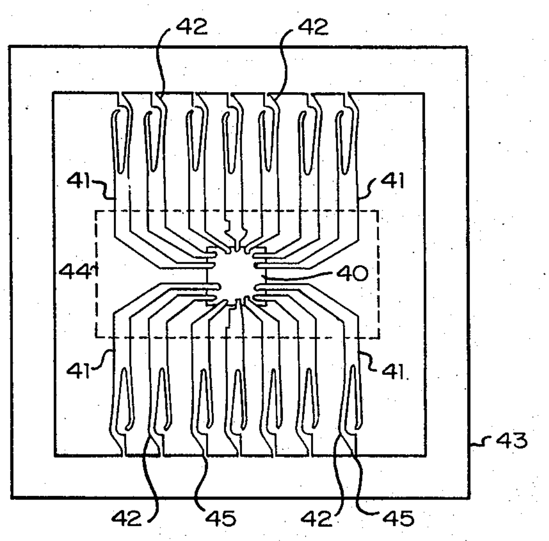
FIG. 4 shows another embodiment having connectors encapsulated in an electrical component.

FIG. 4 is a top view of a typical subminiature component prior to encapsulation. An integrated circuit 40 is shown with associated leads 41 and the connectors 42. The connectors 42 are attached to a removable tab 43 which maintains the alignment of the connectors 42 until the assembly is encapsulated. The broken line 44 shows the region of the assembly which is encapsulated. Following this process the removable tab 43 is separated from each of the connectors at location 45. For connections to a printed circuit board each of the connectors 42 is bent perpendicular to the surface as shown in FIG. 4, for example, between the connector 42 and the surface of the encapsulation 44.

Figure 5:
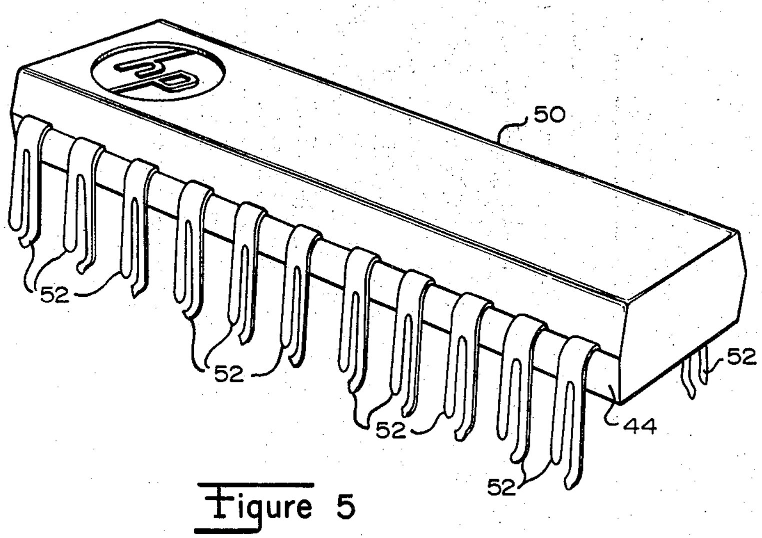
FIG. 5 is a view of several of the connectors attached to leads from an integrated circuit.

FIG. 5 shows a perspective view of an electrical component 50 such as an integrated circuit and a plurality of connectors 52. These connectors are encapsulated within the component and may be connected to elements, for example, within the integrated circuit. They allow the component to be plugged directly into plated-through holes in a printed circuit board. During the process of the encapsulation the connectors may be held in alignment by removable tabs as discussed earlier.

I claim:

1. A plurality of connectors for mechanically and electrically coupling to a device having holes with conductive surfaces therein, wherein each connector comprises:

a base;

a first member having first and second ends and connected at the first end to the base;

a second member having first and second ends and connected at the first end to the base, at least one of the first and second members being flexible relative to the other;

a guide tip connected to the second end of at least one of the first and second members for guiding the second ends of both the first and second members into said hole; and wherein each connector is attached to removable tab means comprising a first strip of material orthogonally attached to a first end of each connector and a second strip of material, parallel to the first strip of material, orthogonally attached to a second end of each connector, the connectors and tab means being coplanar and made from a single piece of material.

2. A connector for mechanically and electrically coupling to a device having a hole with a conductive surface therein comprising:

a base having regions of first and second widths, the second width being greater than the first;

a first member having first and second ends and connected at the first end to the base at the region of second width;

a second member having first and second ends and connected at the first end to the base at the region of second width, the second ends of the first and second members being separated to allow at least one of the second ends to be displaced toward the other; and a guide tip for guiding the second ends of both the first and second members into said hole and having regions of first and second width, the second width being greater than the first, and the second end of one of the first and second members being connected to the guide tip at the region of second width, the base, the first member, the second member, and the guide tip being the same thickness.

3. A connector for mechanically and electrically coupling to a device having a hole with a conductive surface therein comprising:

a base;

a first member having first and second ends and connected to the base at the first end;

a guide tip attached to the first end of the first member for guiding the connector into said hole;

a second member having first and second ends, the second member being connected to the base at the first end and being shorter than the combination of the first member and the guide tip, the second end of the second member being bent towards the first member and extending under the guide tip, and the first and second members, the base, and the guide tip being made from a single piece of sheet-like material.

4. A connector as in claim 3 wherein a region of the base remote from the first and second members has a substantially constant width for insertion into a hole in another device for enabling mechanical and electrical connection of the other device to the base of the connector.

5. A connector as in claim 4 wherein:

the base has a shoulder for limiting the distance the region of substantially constant width can be inserted into the hole in the other device; and each of the first and second members has a shoulder for limiting the distance the first and second members can be inserted into the hole.

6. A connector as in claim 3 wherein:

the guide tip, and the first and second members are coplanar; and the first and second members attach to a common portion of the base.

* * * * *

UNITED STATES PATENT OFFICE

CERTIFICATE OF CORRECTION

Patent No. 3,820,061 Dated June 25, 1974

Inventor(s) Thomas E. Holden

It is certified that error appears in the above-identified patent and that said Letters Patent are hereby corrected as shown below:

Column 4, line 6, cancel "first end" and substitute -- second end --.

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*